United States Patent
Batthish et al.

(10) Patent No.: US 7,293,171 B2
(45) Date of Patent: Nov. 6, 2007

(54) ENCRYPTION TO BCC RECIPIENTS WITH S/MIME

(75) Inventors: Karim Batthish, Seattle, WA (US); Malcolm Davis, Kirkland, WA (US); Roy Williams, Woodinville, WA (US); Jean Wu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 711 days.

(21) Appl. No.: 10/762,094

(22) Filed: Jan. 21, 2004

(65) Prior Publication Data

US 2005/0160292 A1    Jul. 21, 2005

(51) Int. Cl.
H04L 9/00    (2006.01)
(52) U.S. Cl. .................. 713/152; 709/206
(58) Field of Classification Search ............... 713/151, 713/152; 709/206
See application file for complete search history.

(56) References Cited

U.S. PATENT DOCUMENTS 6,584,564 B2 *  6/2003  Olkin et al. ............... 713/152
6,851,049 B1 *  2/2005  Price, III ................... 713/150
7,130,887 B2 * 10/2006  Goldberg ................... 709/206

OTHER PUBLICATIONS

Housley, R.; Cryptographic Message Syntax; *Network Working Group*, Jun. 1999.

Ramsdell, B.; S/MIME Version 3 Message Specification; *Network Working Group*, Jun. 1999.

Hoffman, P.; Enhanced Security Services for S/MIME; *Network Working Group*, Jun. 1999.

Klensin, J.; Simple Mail Transfer Protocol; *Network Working Group*, Apr. 2001.

Resnick, P.; Internet Message Format; *Network Working Group*, Apr. 2001.

* cited by examiner

Primary Examiner—Gilberto Barron, Jr.
Assistant Examiner—Martin Jeriko P San Juan
(74) Attorney, Agent, or Firm—Senniger Powers

(57) ABSTRACT

Encrypted email message structures can contain recipient information that can reveal, to any recipient, all of the other recipients of an email message. Because some recipients, such as recipients to whom the message was "blind carbon-copied", should remain hidden from the other recipients, individual encrypted messages can be created. One encrypted message can be created for all of the recipients who are intended to be revealed, such as the recipients listed in the TO and CC fields of an email header. A second encrypted message can be created for all of the recipients of the message who are intended to be hidden, such as the recipient listed in the BCC field of an email header. Alternatively, multiple encrypted messages can be created individually for each recipient in the BCC field, if the BCC recipients are to be hidden even from other BCC recipients.

19 Claims, 7 Drawing Sheets

ENCRYPTION TO BCC RECIPIENTS WITH S/MIME

FIELD OF THE INVENTION

This invention relates generally to secure electronic mail messaging and, more particularly, relates to a system and method for more efficiently protecting the identity of recipients of electronic mail messages.

BACKGROUND

Electronic mail, or email, has become a ubiquitous element of modern communications. Many credit the explosive growth of the Internet, and internal corporate networks, to the ability of people to communicate and work together through email. In an effort to ensure that email from many different computing platforms can be seamlessly exchanged among the platforms, standards have been developed defining the structure of email messages, and the protocols and mechanisms used to transport and deliver those messages.

One standard for governing the transmission of email messages is known as the Simple Mail Transfer Protocol, or SMTP. SMTP defines a series of commands that computing devices can use to transfer email messages from one computing device to another. Generally, SMTP allows two computing devices to establish a two-way transmission channel to transfer one or more pieces of mail in three basic steps. A first step can transfer information regarding the sender of the email message, a second step can transfer information regarding the intended recipients of the email message, and a third step can transfer the actual contents of the email message itself.

Because of the distributed nature of networks, including the Internet, SMTP contemplates that a single email message from a sender to a recipient may be transmitted in the above described manner multiple times between intermediate host computing devices. When an intermediate host computing device receives an email message for further transmission, it can initiate another SMTP channel with a further computing device and conduct a similar transfer. However, once the email is received at its final destination, the contents of the email message can be presented to a user through an email reader program or the like.

To further ensure the seamlessness of email messages as they are exchanged between platforms, the structure of the mail data itself can also be standardized. One standard for the structure of email messages is known as the Internet Message Format. The Internet Message Format divides mail data into lines of characters having a maximum length. An email message can comprise header fields and a body containing the text or other data that one user wished to transfer to other users. The header fields can be composed of a field name and a field body. Commonly recognized field names include the TO, FROM, DATE, CC and BCC. While such fields may contain similar information as is transferred between computing devices via an SMTP channel, the header fields are visible to readers of the email message, while the information transferred as part of the first two steps of an SMTP transfer can be exclusively used by mail transferring programs.

Of particular concern can be the treatment of the recipients listed in the BCC field. The BCC field, or "blind-carbon-copy" field, is intended to provide email senders a mechanism by which they can send email messages to certain individuals without allowing other recipients of the same message to know that those individuals received a copy. For example, senders may wish to protect the identity of certain recipients or they may wish to protect the email address of certain recipients. Therefore, while all of the recipients BCCed on an email message can appear, in the form or an email address, as one of the arguments transferred with an SMTP RCPT command, those same recipients may not appear in the BCC header field of the email data sent to other recipients.

Three possibilities are defined for protecting the identity of recipients listed as BCCed on an email message. Prior to transmitting the email, the sending computing device can remove the BCC header from the email data and then transmit the message to all of the recipients. Alternatively, the BCC header can be removed only from the email data sent to the recipients listed in the TO and CC header fields, while the recipients listed in the BCC header field can receive an alternative email data containing the BCC header field. A third defined possibility allows the transmission of a blank BCC header field to all of the recipients.

As can be seen from the above description, an email message can be represented as an envelope of data, with the envelope containing information regarding the sender and recipients of the data, and the data containing header information and additional data intended for the recipient. Protocols such as SMTP can define a transfer mechanism for the envelope, including the sender and recipient information, and protocols such as the Internet Message Format can define an interpretation mechanism for the data contained in the envelope.

However, neither SMTP nor the Internet Message Format provide protection against tampering. Thus, a malicious user or computing device could intercept email messages, and alter their contents. To prevent such tampering, a secure encoding scheme, such as S/MIME can be used. The Multipurpose Internet Mail Extensions (MIME) encoding scheme establishes a common mechanism by which any data can be transferred by the above described protocols. Specifically, the MIME encoding scheme allows data to be encoded into a text-based format, and provides headers which can specify the type of data that is encoded, to aid in the decoding of the data by the recipient.

The Secure Multipurpose Internet Mail Extensions (S/MIME) encoding scheme can be used with the Cryptographic Message Syntax (CMS) to provide mechanisms by which the content of an email message, including any MIME encoded data contained within the message, can be encrypted in such a manner that each recipient listed in the headers of the message receives the encrypted data and an encryption key encrypted specifically for that recipient. This encrypted data can then either be attached to a part of the message that is not encrypted, together with MIME headers specifying the encryption of the data, and the email message headers. Such an encrypted email message can then be transmitted through ordinary message transmission algorithms, such as SMTP, while protecting the contents of the email message from malicious attacks.

The combination of S/MIME and CMS can sign data and encrypt data in various combinations to protect the content of an email message. For example, a textual message that is to be sent securely using the S/MIME encoding scheme can first be converted to a canonical form that is representable on both the sending and receiving computing platforms. Once converted, it can be signed, and then the signed data can then be further encrypted for each recipient and packaged. This package can then be placed in an email message, having appropriate headers, which can further be transmitted in an envelop according to SMTP, as described above. Upon receipt by each of the recipients, the email message can be opened, the data can be unencrypted, and its integrity can be verified. In such a manner an email message can be protected during transit.

However, while S/MIME can provide for the protection of email contents, the existence of recipient-specific information in S/MIME data formats can reveal the identity of recipients that were only BCCed on the email message, even if the BCC field is removed from the header of the email. Specifically, the content of an S/MIME email message is individually encrypted for each recipient, including the recipients listed in the BCC field. Thus, even though the header may have had all BCC information removed as described above, certificate identifiers and other recipient-specific information, including information specific to BCC recipients, can still be found in an unencrypted form as part of the encrypted email package. Consequently, by merely referencing this unencrypted, recipient-specific information, the identity of all recipients, including BCC recipients can be determined by any recipient.

BRIEF SUMMARY OF THE INVENTION

Embodiments of the invention allow BCC recipients of email messages to remain hidden to the other recipients of the email messages despite the use of encrypted message formats, such as S/MIME.

In an embodiment, an encrypted message can be created for all of the recipients other than the BCC recipients, and individual encrypted messages can be created for each BCC recipient.

In another embodiment, an encrypted message can be created for all of the recipients other than the BCC recipients, and another encrypted message can be created for all of the BCC recipients.

In a further embodiment, a mailing list manager administering a mailing list whose membership is confidential can individually encrypt messages for each member.

In a further embodiment, multiple encrypted messages can be created by either the email client or by an email server.

In a further embodiment, multiple encrypted messages can be created by the same encryption key to increase efficiency. Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Electronic mail messages can be conceptualized as being comprised of two basic elements: an envelope that transfers a mail message, and the mail message itself. Therefore, analogizing to a physical letter which can be written on a piece of paper and then sealed in an envelope for delivery, an electronic mail message can be delivered between computing devices via a conceptual envelope. Furthermore, just as a physical letter can contain addressing information on the envelope and on the letter itself, so too an email message can contain headers and other information that can reveal sender and recipient information, while the email envelope can also contain sender and recipient data. However, unlike physical letters, an email envelope is a conceptual construct that is generally not revealed to the users receiving email messages. Therefore, the sender and recipient information available to email recipients can be controlled by limiting the information contained within the email message, while the addressing on the conceptual envelope can ensure proper delivery.

Figure 1:
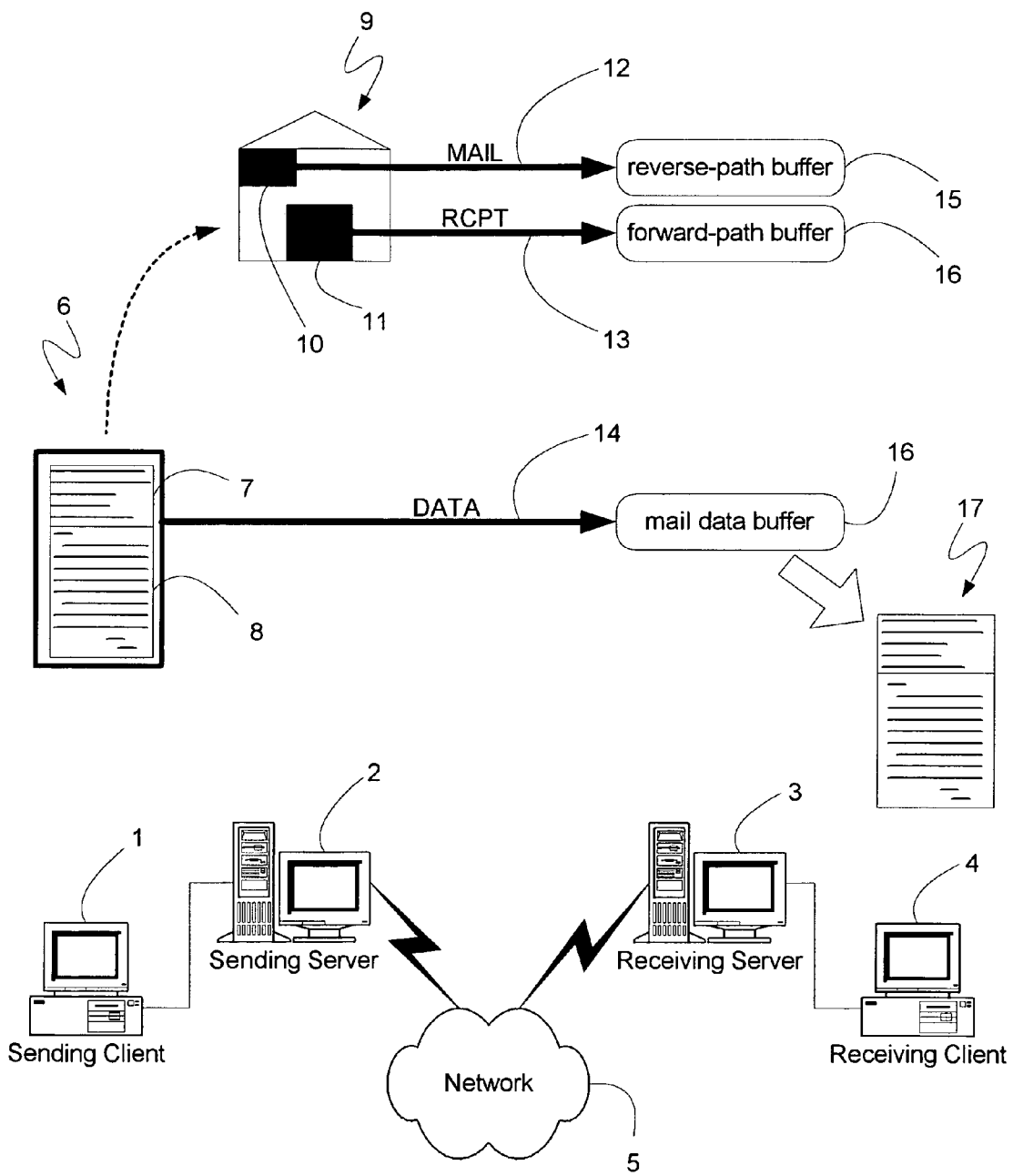
FIG. 1 is a block diagram generally illustrating email message creation and transmission according to an embodiment of the present invention.

Turning to the drawings, wherein like reference numerals refer to like elements, FIG. 1 illustrates a general overview of non-encrypted email messages. Specifically, a computing system is shown comprising a sending client 1, a sending server 2, a receiving server 3, and a receiving client 4. The sending client 1 can communicate with the sending server 2, and the receiving client 4 can communicate with the receiving server 3 through various networked connections and protocols. Similarly, sending server 2 can communicate with the receiving server 3, through a network 5. Network 5 can comprise both physical and wireless connections, and can rely on any networking protocols, including the ubiquitous Transmission Control Protocol/Internet Protocol (TCP/IP). Network 5 can also be comprised of any number of interconnected computing devices, and as will be understood by those skilled in the art, communication between sending server 2 and receiving server 3 can pass through any number of intermediate computing devices in the network 5.

The sending client 1 can create an email message 6, comprising a header 7 and an email body 8. The email body 8 could have been generated by an end user, such as by typing an email message, or it could be an automatically generated email, such as a monthly account statement or the like. In addition to text, the email body can also contain data in specialized formats that can be encoded to allow such data to be transferred in an email message. One mechanism for encoding data into a format by which it can be transferred in an email message and properly received and decoded by the recipient is the Multipurpose Internet Mail Extensions (MIME) encoding scheme. As will be known by those skilled in the art, the MIME encoding scheme defines a mechanism whereby data can be encoded into a textual format and can be appended to an email message, together with MIME header information that can identify the type of data encoded.

In addition to the body 8, an email message 6 can contain a header 7 that can provide information regarding the email message. For example, common information contained in the header 7 can include an indication of the sender of the email message, the intended recipients, and the date and time at which the message was sent. The header 7 can be created by the sending client 1 or the sending server 2, and can be modified as the email 6 is transmitted through network 5.

To facilitate interoperability between email clients on various platforms, header information can be presented in a standardized format. For example, the fields of the header 7 can be defined in advance, with each field containing a specific set of data formatted in a predefined manner. One standard for the structure of email messages, including the email message header, is known as the Internet Message Format. As will be known to those skilled in the art, the Internet Message Format defines various fields in an email message header, including fields containing the intended recipients of the email message, namely the "TO", "CC", and "BCC" fields. As explained above, the addressing information that can be used to transfer email messages can be thought of as part of the envelope. Thus, the information contained within the TO, CC, and BCC fields can be modified before the email is sent to accommodate the intended uses of these fields without affecting the delivery of the email message through the network.

The TO field is generally intended to identify those recipients to whom the email is directed, while the CC (or "carbon-copy") field is generally intended to identify those recipients who may be interested in the email or tangentially involved with the subject matter of the email. The BCC (or "blind-carbon-copy" field) is generally intended to identify those recipients who would have been listed in the CC field, except that the sender did not wish to disclose their identity to the other recipients of the email. To avoid disclosing the recipients of the BCC field, the Internet Message Format suggests three possibilities: (1) removing the BCC field prior to sending the message, (2) sending a blank BCC field, or (3) creating a separate message, containing the BCC field, to be sent to those recipients listed in the BCC field, either as a group, or individually such that each recipient receives a message containing only that recipient in the BCC field. Because the conceptual envelope used to send the mail includes the recipients from the BCC field, each of the BCC recipients can still receive a copy of the message, even., though the BCC field can be modified, cleared, or removed entirely. Additional information regarding email message formats, including header formats, can be found in the document entitled "Internet Message Format", Request for Comments: 2822, published by the Network Working Group of the Internet Engineering Task Force, dated April 2001, whose contents are herein incorporated by reference in their entirety to further explain or describe any teaching or suggestion contained within the present specification that is consistent with their disclosures.

Returning to FIG. 1, the email message 6 can be packaged into a conceptual envelope 9 comprising sender information 10 and recipient information 11. The sender information 10, recipient information 11, and the email data itself can be transmitted by the sending server 2 to the receiving server 3 via network 5 through any common email transfer protocol.

One commonly implemented protocol for the transmission of email messages is known as the Simple Mail Transfer Protocol (SMTP). The conceptual envelope 9 can be implemented as a series of protocol units defined by SMTP. Specifically, SMTP defines the transfer of an email message between two computing devices via three basic steps. A first basic step can be the MAIL command 12, which can transfer the sender information 10, including the email address of the sender of the email message 6 or, alternatively, an email address to which errors regarding message 6 should be reported. Such information can be transferred in an SMTP protocol unit for reverse-path data, and can be stored in a reverse-path buffer 15 at the receiving server 3.

A second basic step in an SMTP email message transfer can be a RCPT command 13, which can transfer the recipient information 11, including the email addresses of the intended recipients of the message 6. The recipient information can include the address of the recipients listed in the TO, CC and BCC fields of the email header 7, even if the message that is being sent may have had those fields altered, cleared, or removed. For example, all of the recipients in the BCC field can be identified via a RCPT command 13, even though the message being sent has had the BCC field removed. Additionally, the RCPT command can contain recipient information that is not specifically in the TO, CC or BCC fields, such as if the user had only entered an alias for a group or a mailing list identifier in these fields. In such a case, the individual recipients that comprise these groups or mailing lists can also be listed as part of the RCPT command. Because the RCPT command can identify all of the recipients, information from the RCPT command is generally kept from the recipients and is not included in data that the recipients would have access to, such as the header 7 or email body 8. Recipient information can be transferred in an SMTP protocol unit for forward-path data, and can be stored in a forward-path buffer 16 at the receiving server 3.

The third basic step in an SMTP email message transfer can be the transfer of the data of the email message itself. As illustrated in FIG. 1, email message 6 can be transferred via a DATA command 14 and stored in a mail data buffer 16 at the receiving server 3. The data of the email message can be transferred in one or more SMTP DATA protocol units, with the final DATA protocol unit transferring a line of text containing only a period as a signal that the transfer of the email message 6 has completed.

If the receiving server 3 is the ultimate destination for the message 6, it can pass along the contents of the mail data buffer 16, in the form of an email message 17 to the client 4. If the transmission illustrated in FIG. 1 was accomplished properly, email message 17 can contain the same email body 8 as the original email message 6. If the receiving server 3 is not the ultimate destination for the message 6, it can reference routing tables, or other known information, to locate a further server to which it can transfer message 6 in a manner analogous to that described above. Additional information regarding email transfer protocols, including additional commands and their formats, can be found in the document entitled "Simple Mail Transfer Protocol", Request for Comments: 2821, published by the Network Working Group of the Internet Engineering Task Force, and dated April 2001, whose contents are herein incorporated by reference in their entirety to further explain or describe any teaching or suggestion contained within the present specification that is consistent with their disclosures.

Although not required, the invention will be described in the general context of computer-executable instructions, such as program modules, being executed by a computing device. Generally, program modules include routines, programs, objects, components, data structures, etc. that perform particular tasks or implement particular abstract data types. Moreover, those skilled in the art will appreciate that the invention may be practiced with other computer system configurations, including personal computers, server computers, hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

Figure 2:
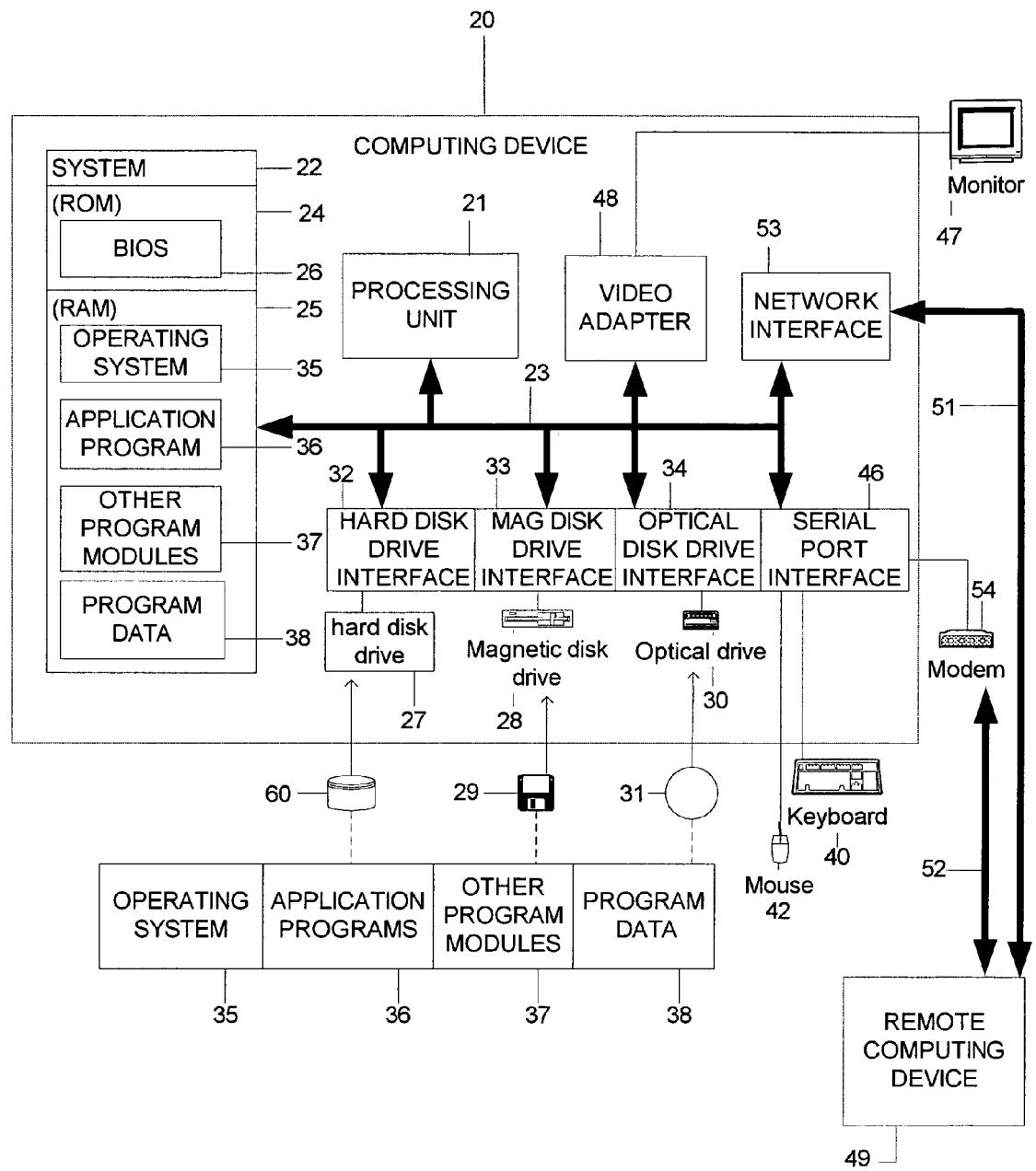
FIG. 2 is a block diagram generally illustrating an exemplary device architecture in which embodiments of the present invention may be implemented.

Turning now to FIG. 2, a general purpose computing device 20 is shown, including a processing unit 21, a system memory 22, and a system bus 23 that couples various system components including the system memory 22 to the processing unit 21. The computing device 20 can be either of the client computing devices 1 and 4 or the server computing devices 2 and 3, illustrated in FIG. 1. However, the forgoing description is intended only to describe a general purpose computing device, and not any of the devices 1-4 specifically.

Returning to FIG. 2, the system bus 23 can be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computing device 20, such as during start-up, is stored in ROM 24. The computing device 20 further can include a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the computing device 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the computing device 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. An optional monitor 47 or other type of display device can also be connected to the system bus 23 via an interface, such as a video adapter 48. In addition to the monitor, computing devices can typically include other peripheral output devices, not shown, such as speakers and printers.

The computing device 20 can operate in a networked environment using logical connections to one or more remote computers, such as a remote computing device 49. The remote computing device 49 may be another personal computer, a server, a router, a network PC, a peer device or other common network node, and typically includes many or all of the elements described above relative to the computing device 20. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computing device 20 is connected to the local network 51 through a network interface or adapter 53. When used in a WAN networking environment, the computing device 20 typically includes a modem 54 or other means for establishing communications over the WAN 52. The modem 54, which may be internal or external, is connected to the system bus 23 via the serial port interface 46. Program modules depicted relative to the computing device 20, or portions thereof, may be stored in the remote memory storage device if such is present. It will be appreciated that the network connections shown are exemplary and other means of establishing a communications link between the computers may be used.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computing device, which reconfigures or otherwise alters the operation of the computing device in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various acts and operations described hereinafter may also be implemented in hardware.

Figure 3:
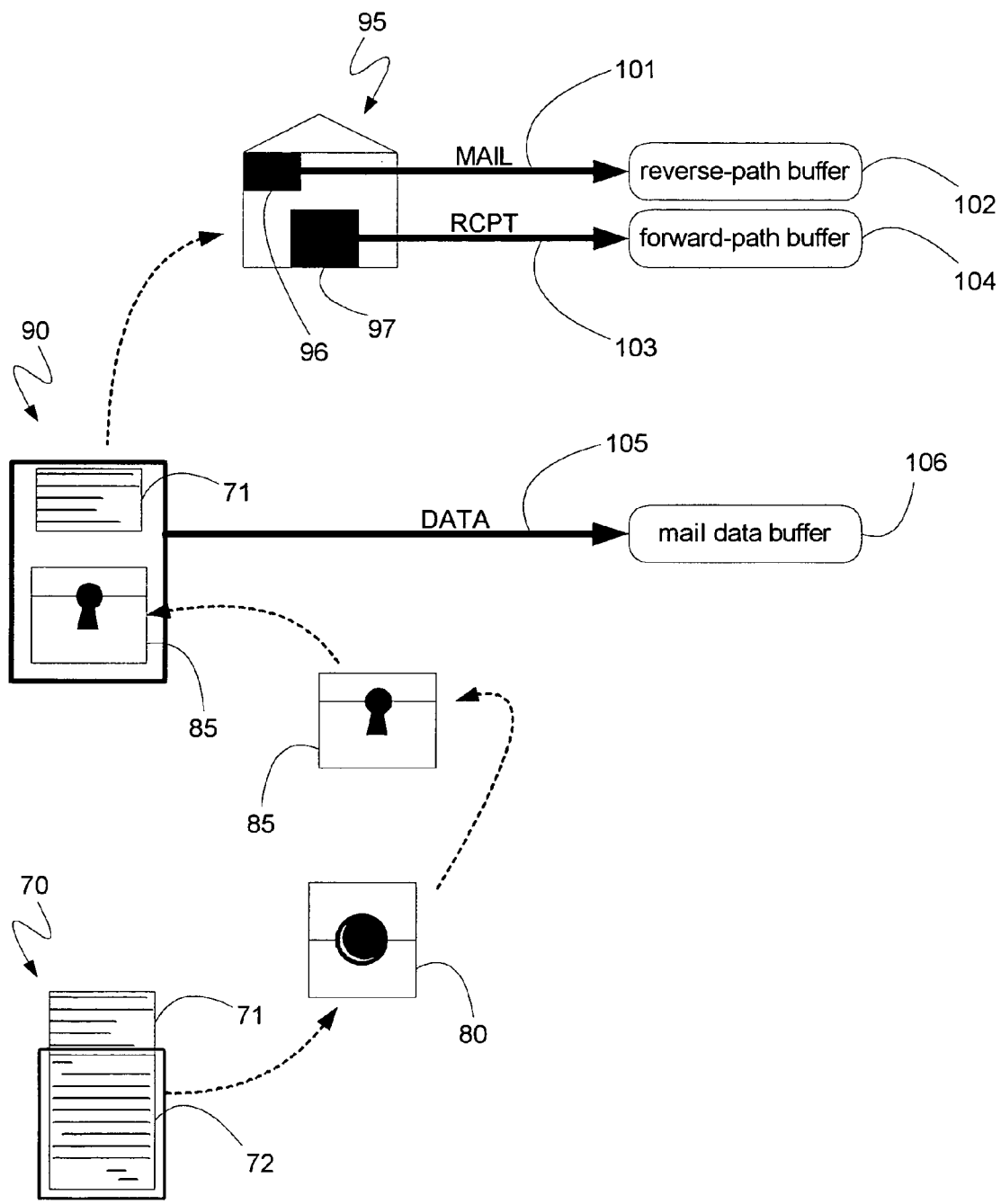
FIG. 3 is a block diagram generally illustrating secure email message creation and transmission according to an embodiment of the present invention.

Turning to FIG. 3, an illustration of the use of digital signatures and encryption to protect email messages during transfer is shown. As will be known to those skilled in the art, the email message transfer described above with reference to FIG. 1 is unsecured. Thus, any sufficiently skilled user can intercept the email message 6 and can thereby read the email body 8. A malicious user or computing process could, therefore, access confidential information contained in the email body 8 or alter the contents of the email message 6.

To more adequately protect the contents of email messages as they are transmitted across unsecured networks, secure message encoding schemes can be used. Secure message encoding schemes can include Secure Multipurpose Internet Mail Extensions (S/MIME) and Cryptographic Message Syntax (CMS). As described above, the MIME encoding scheme provides a mechanism for encoding any data into a format by which it can be attached to an email message and transferred using common email transfer protocols, such as the above described SMTP. The S/MIME encoding scheme, as will be known by those skilled in the art, provides a mechanism for encoding protected data, such as data signed and/or encrypted using the CMS encoding scheme. By using S/MIME and CMS, some or all of an email message's content can be signed and/or encrypted and the resulting data can be attached to an email message for transmission. Thus, the message content that was signed or encrypted becomes an attachment to either those parts of the message that were not secured, or to a blank message containing only header information. Additionally, just as the MIME encoding scheme provides headers for each encoded data, specifying the type of data, S/MIME contents can be identified by an "application/pkcs7-mime" or a "multipart/signed" type in a "content-type" MIME header.

Returning to FIG. 3, an email message 70 is shown having a header 71 and an email body 72. If the email body 72 is to be transmitted using the S/MIME encoding scheme, an initial step can be to convert to canonical form the parts of the email body 72 that are to be signed or encrypted. Such a canonical form can be represented in both the computing environment in which the email message 70 is intended to be read, and in the computing environment in which it is created.

Once the conversion to a canonical form is complete, the email body 72 can be signed, resulting in a signed package 80. As will be known by those skilled in the art, a recipient receiving a signed message can verify that the message was not modified during transmission. However, signed package 80 may not prevent any unintended user from viewing the contents of the email body 72. Therefore, as a further step, the signed package 80 can be encrypted for each of the intended recipients into an encrypted package 85.

The encrypted package 85, or the signed package 80 can be added to an email message 90 in a manner similar to the addition of any encoded data via the MIME encoding scheme. In particular, packages such as the signed package 80 and the encrypted package 85 can be of type "application/pkcs7-mime" or "multipart/signed" and such type designations can be specified in a MIME header which can be created when the signed package 80 or encrypted package 85 are added to message 90.

The email message 90, containing a encrypted package 85, can be transmitted in a manner similar to that described above with reference to email message 6. Specifically, using the SMTP, a conceptual envelope 95, containing message 90, can be transmitted by using a MAIL command 101, a RCPT command 103, and a DATA command 105 to transmit reverse-path information, forward-path information, and the mail data, respectively, to a reverse-path buffer 102, a forward path buffer 104 and a mail data buffer 106 on a recipient computing device. Once the intended recipient receives message 90, they can use appropriate computing instructions to unlock the encrypted package 85 and verify the signed package 80 to ensure that the message has not been altered. In such a manner, an email message can be securely transmitted across any type of network environment.

As will be evident to those skilled in the art, the S/MIME encoding scheme allows for multiple layers of encryption and signing. For example, the message body 72 could have been encrypted for the intended recipients first, and then that encrypted package could have been digitally signed. Alternatively, encrypted package 85, as shown in FIG. 3, could have been further signed by another device, or even encrypted again. Each signature and encryption can act as their own layer, allowing different computing devices to, for example, sign intermediate messages, providing recipients with a chain of signatures that can help pinpoint any changes to the message. Additional information regarding secure email transfer encoding schemes, including additional data types and handshaking procedures, can be found in the document entitled "S/MIME Version 3 Message Specification", Request for Comments: 2633, published by the Network Working Group of the Internet Engineering Task Force, and dated June 1999, whose contents are herein incorporated by reference in their entirety to further explain or describe any teaching or suggestion contained within the present specification that is consistent with their disclosures.

As indicated above, the S/MIME encoding scheme can rely on known formats to facilitate the creation of an encrypted package, such as encrypted package 85, and a signed package, such as signed package 80. One known format for signed data is the "signed-data" content type. Signed data of the "signed-data" content type can be constructed through a series of steps. An initial step can be the computation of a message digest, or hash value, on the content to be signed, using a message digest creation algorithm. Alternatively, the message digest could be computed on the content combined with a series of attributes, such as the time at which the digest is being computed, and the attribute types. Message digest creation algorithms include the Secure Hash Algorithm version 1 (SHA-1) and the MD5 algorithm.

Once a message digest is computed, the message digest can be signed using the signer's private key. Signature algorithms that can be used to sign the message digest include the RSA algorithm and the DSA algorithm. After the message signature is computed, a signed package can be created by combining the content itself, the message signature, an identification of the algorithms used, the signer's public key, and additional information into a predefined structure of the "signed-data" content type. Such information can allow a recipient to independently compute the message digest and then use this independently computed message digest and the signer's public key to verify the message signature value in a manner known to those skilled in the art.

As indicated above, the S/MIME encoding scheme can rely on known formats to facilitate the creation of an encrypted package, such as encrypted package 85, and a signed package, such as signed package 80. One known format for encrypted data is the "enveloped-data" content type. Generally, the "enveloped-data" content type comprises the encrypted content itself and a series of encrypted versions of the key used to encrypt the content, where each encrypted version of the key is encrypted for an intended recipient. The combination of the encrypted content and a recipient-specific encrypted key is referred to as a "digital envelope" for that recipient. As will be known by those skilled in the art, any number of digital envelopes can be combined into a single encrypted package of the "enveloped-data" type, though, to conserve space, generally only one copy of the encrypted content is stored in any given encrypted package.

An encrypted package of the "enveloped-data" content type can be created through a series of steps. An initial step can be the generation of a key to encrypt the content. Such a key can be generated randomly by any number of key generation algorithms, but can be as simple as a random number. Once an encryption key has been created, the key can be encrypted for each recipient. One mechanism for encrypting the encryption key for each recipient is to use the recipient's public key. The recipient can then use their corresponding private key to decrypt the encryption key and can then decrypt the message content that was encrypted using the encryption key. Another mechanism for encrypting the encryption key for each recipient uses the recipient's public key and the sender's private key to generate a pairwise symmetric key. The encryption key can then be encrypted using this pairwise symmetric key. Yet another mechanism for encrypting the encryption key for each recipient is to simply agree on a symmetric key with the recipient and use the symmetric key to encrypt the encryption key. Standardized algorithms that can be used to implement the above described exemplary key management mechanisms can include the Diffie-Hellman, RSA, Triple-DES Key Wrap, RC2 Key Wrap, and RSAOEAP algorithms. Once the encryption key has been encrypted for each recipient, the encrypted encryption key and an indication of which encryption mechanism was used can be collected for each intended recipient.

As indicated above, the content itself can be encrypted using the previously derived encryption key. Various algorithms can be used to encrypt the content with the encryption key, including the Data Encryption Standard (DES), Triple-DES, RC2 and AES algorithms. As will be known to those of skill in the art, content is generally encrypted by mapping a string of octets, comprising the content, to another string of octets, often referred to as "the ciphertext", under the control of the content encryption key. Depending on the size of the content, padding may be added to increase the content to an appropriate size multiple to facilitate encryption.

The encrypted content, together with the collection of recipient-specific information, including the recipient-specific encrypted encryption key, can be collected into a single package of the "enveloped-data" content type, which can be transmitted. Upon receipt by a recipient, the recipient can locate their encrypted encryption key, decrypt the encryption key, and then use it to decrypt the content and access it.

As can be seen from the above detailed description, the creation of signed packages and encrypted packages can be accomplished via a number of standard algorithms for signing and encrypting content. One method by which a sender can determine which algorithm to use is to request supported algorithms from the intended recipients in an initial handshake that can be accomplished through an SMTP channel prior to the sending of the envelope 95. Alternatively, the sender and the intended recipients can exchange information prior to the initiation of an SMTP channel, such as through alternative networked communications or even exchanges of computer-readable media such as floppy disks or compact disks. Yet another alternative can simply require each recipient to support some pre-defined minimum set of algorithms. Such a mechanism can be useful for mailing lists or other environments in which a large collection of users may be receiving common messages.

If the above described methods, or similar methods, do not provide the sender with sufficient information with which to determine which algorithms to use to sign or encrypt message content, the sender can attempt to determine which algorithms are supported by the intended recipients by examining previous signed or encrypted messages from those same recipients. Furthermore, if one group of recipients supports more secure algorithms than another group, the sender can create two messages: one utilizing the more secure algorithms and sent to the first group, and a second utilizing the less secure algorithms and sent to the second group. Alternatively, the sender can select to not send messages to those recipients who do not support algorithms which the sender deems sufficiently secure for the contents being transmitted.

Figure 4:
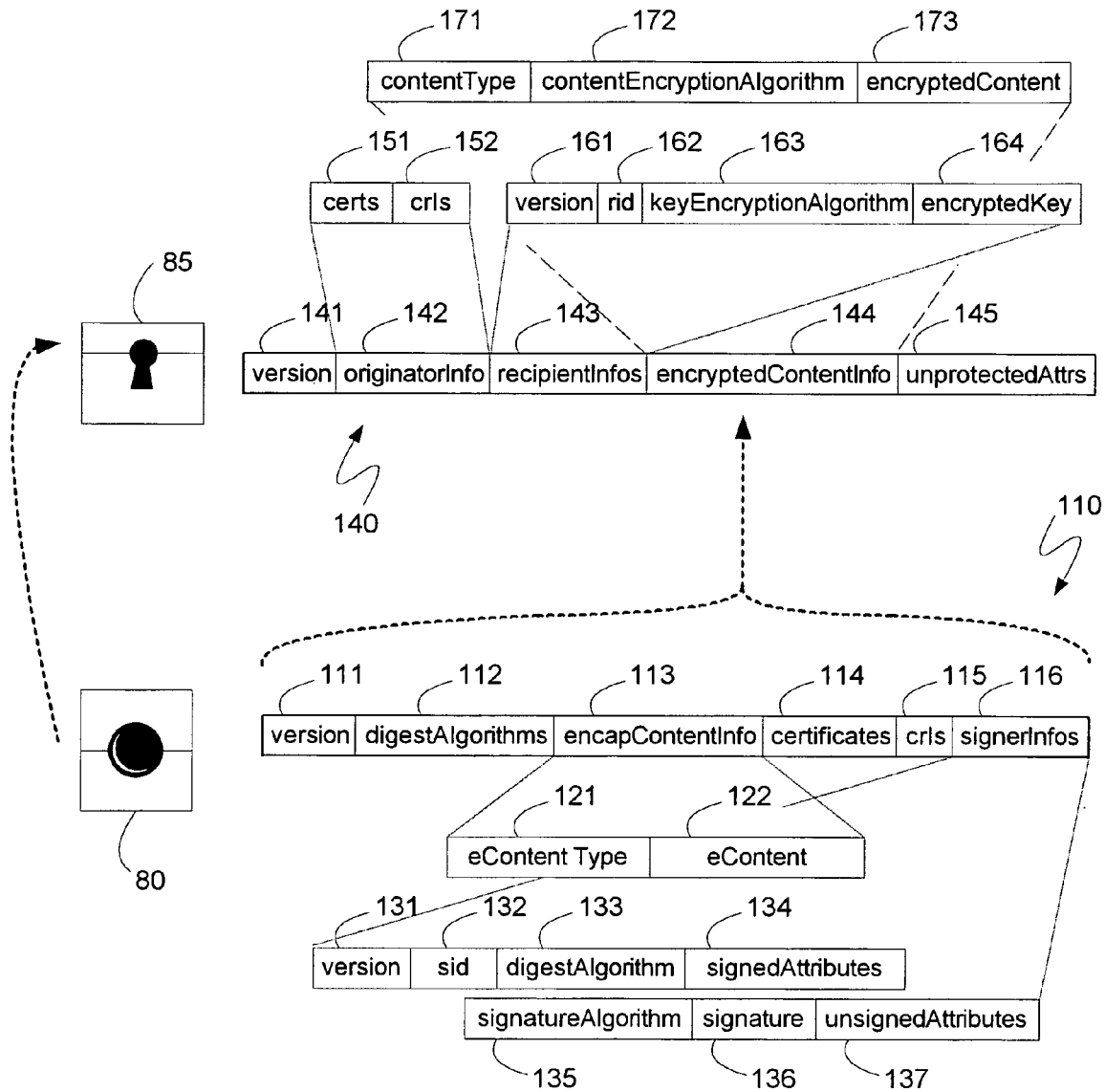
FIG. 4 is a block diagram generally illustrating a format for secure email messages according to an embodiment of the present invention.

Turning to FIG. 4, an exemplary structure of the "signed-data" and "enveloped-data" content types is shown. For illustrative purposes, the fields of the "signed-data" and "enveloped-data" content types are shown with reference to the signed package 80 and encrypted package 85 described above. However, as was also described in detail above, the data can be encrypted or signed in any order and any number of times.

Data of type "signed-data" is shown in structure 110 having six fields: a version field 111, a digestAlgorithms field 112, an encapContentInfo field 113, a certificates field 114, a crls field 115, and a signerInfos field 116. The version field 111 can indicate the version number of-the syntax of the structure 110. The digestAlgorithms field 112 can be a collection of message digest algorithm identifiers, identifying the message digest algorithm that was used to compute the message digest, or hash value, of the signed data. As described above, such algorithms can include the SHA-1 and the MD5 algorithms. encapContentInfo field 113 can be the signed data itself. As illustrated in FIG. 4, the encapContentInfo field 113 can be comprised of two sub-fields, an eContentType field 121, specifying the type of the data that was signed, and an eContent field 122, containing the signed data itself. The certificates field 114 can be a collection of certificates which can be sufficient to contain a chain from a recognized top-level certification authority to the signer. The crls field 115 can be a collection of certificate revocation lists to allow the recipients to determine whether or not the certificates in the certificates field 114 are valid. Lastly, the signerInfos field 116 can be a collection of information regarding each signer of the data.

As shown in FIG. 4, the signerInfos field 116 can include a series of sub-fields containing various signer specific information. The version sub-field 131 can indicate the version number of the syntax of the sub-fields 131-137. The sid sub-field 132 can indicate the signer's certificate, including information, such as the signer's public key, that can provide the information to allow the recipient to verify the message signature. The digestAlgorithm sub-field 133 can contain an identification of the message digest algorithm that was used to compute the message digest, or hash value, of the signed data. As described above, such algorithms can include the SHA-1 and the MD5 algorithms. The signedAttributes sub-field 134 can contain signed attributes of the email message. The signatureAlgorithm sub-field 135 identifies the signature algorithm that was used to generate the signature, including any associated parameters. As described above, such algorithms can include the DSA and the RSA algorithms. The signature sub-field 136 can contain the computed signature itself, and the unsignedAttributes field 137 can contain attributes of the email message that are not signed. As will be understood by those of skill in the art, if the email message is signed multiple times by multiple entities, the signerInfos field 116 can contain information for each of the signers in sub-fields 131-137.

Data of type "enveloped-data" is shown in structure 140 having five fields: a version field 141, an originatorInfo field 142, a recipientInfos field 143, an encryptedContentInfo field 144, and an unprotectedAttrs field 145. The version field 141 can indicate the version number of the syntax of structure 140. The originatorInfo field 142 can provide information about the originator of the encrypted data. As shown in FIG. 14, the originatorInfo field 142 can have two sub-fields: a certs sub-field 151, which can contain the encryptor's certificates and a crls sub-field 152, which can contain certificate revocation lists that can allow a recipient to determine whether the certificates in the certs sub-field 151 are valid. Depending on the algorithm used to encrypt the encryption keys, the certificates contained in the certs sub-field 151 can provide information, such as the sender's public key, that can be used by the recipient to decrypt the encryption key.

The recipientInfos field 143 can contain a collection of information, described in detail above, that is specific to each recipient. Furthermore, the content and organization of the recipientInfos field 143 can depend on the mechanisms, also described above, that are used to securely deliver the encryption key to the intended recipients. FIG. 4 illustrates exemplary sub-fields 161-164 that can be used if the encryption key is to be securely transferred to the recipients by encrypting the encryption key for each recipient. The version sub-field 161 can indicate the version number of the syntax of sub-fields 161-164. The rid field 162 can contain an indication if the recipient's certificate or key that was used by the sender to encrypt the encryption key. The keyEncryptionAlgorithm sub-field 163 can indicate the encryption algorithm used to encrypt the encryption key for each recipient. As described above, such algorithms can include the Diffie-Hellman, RSA, Triple-DES Key Wrap, RC2 Key Wrap, and RSAOEAP algorithms. The encryptedKey sub-field 164 can contain the encrypted encryption key itself, encrypted for each intended recipient.

The encryptedContentInfo field 144 can contain the encrypted data itself, in addition to other identifying information. As shown in FIG. 4, the encryptedContentInfo field 144 can be comprised of sub-fields 171-173. The contentType sub-field 171 can contain an indication of the data type of the content that is encrypted. The contentEncryptionAlgorithm sub-field can contain an indication of the encryption algorithm used to encrypt the content, and can also provide any associated parameters that were used in encrypting the content. Possible encryption algorithms, as indicated above, include the DES, Triple-DES, RC2 and AES algorithms. The encryptedContent sub-field 173 contains the encrypted content itself. Finally, the last field of package 140, the unprotectedAttrs field 145, can contain any attributes that are not protected by encryption. Additional information regarding secure encoding schemes, including additional variations of the sub-fields of the recipientInfos field 143, can be found in the document entitled "Cryptographic Message Syntax", Request for Comments: 2630, published by the Network Working Group of the Internet Engineering Task Force, and dated June 1999, whose contents are herein incorporated by reference in their entirety to further explain or describe any teaching or suggestion contained within the present specification that is consistent with their disclosures.

FIG. 3 illustrated an exemplary situation in which message body 72 may have been digitally signed first, creating signed package 80, and then subsequently encrypted to create encrypted package 85. To illustrate this exemplary situation, FIG. 4 indicates that the structure 110 can be stored within structure 140. More specifically, structure 110 can be encrypted and subsequently converted to a textual format using an encoding scheme such as the ubiquitous base 64 encoding scheme. Subsequently, in accordance with the S/MIME encoding scheme, as described above, MIME headers can be prepended to the textual representation of the encrypted version of structure 110. This S/MIME formatted data can be inserted into the encryptedContentInfo field 144, and specifically into the encryptedContent sub-field 173, using known mechanisms such as ASN encoding.

As can be seen from the above detailed description, encrypted content using a package such as package 140 can include information about each recipient to which package 140 will be sent. For example, the recipientInfos field 143 can contain numerous elements that uniquely identify a recipient. Therefore, even if the BCC field is removed from the header of an email message, in the manner described in detail above, information such as that contained in the recipientInfos field 143 can allow all of the recipients of an S/MIME encrypted email message to determine who all of the other recipients were, including the BCC recipients that were intended to remain unknown.

Figure 5:
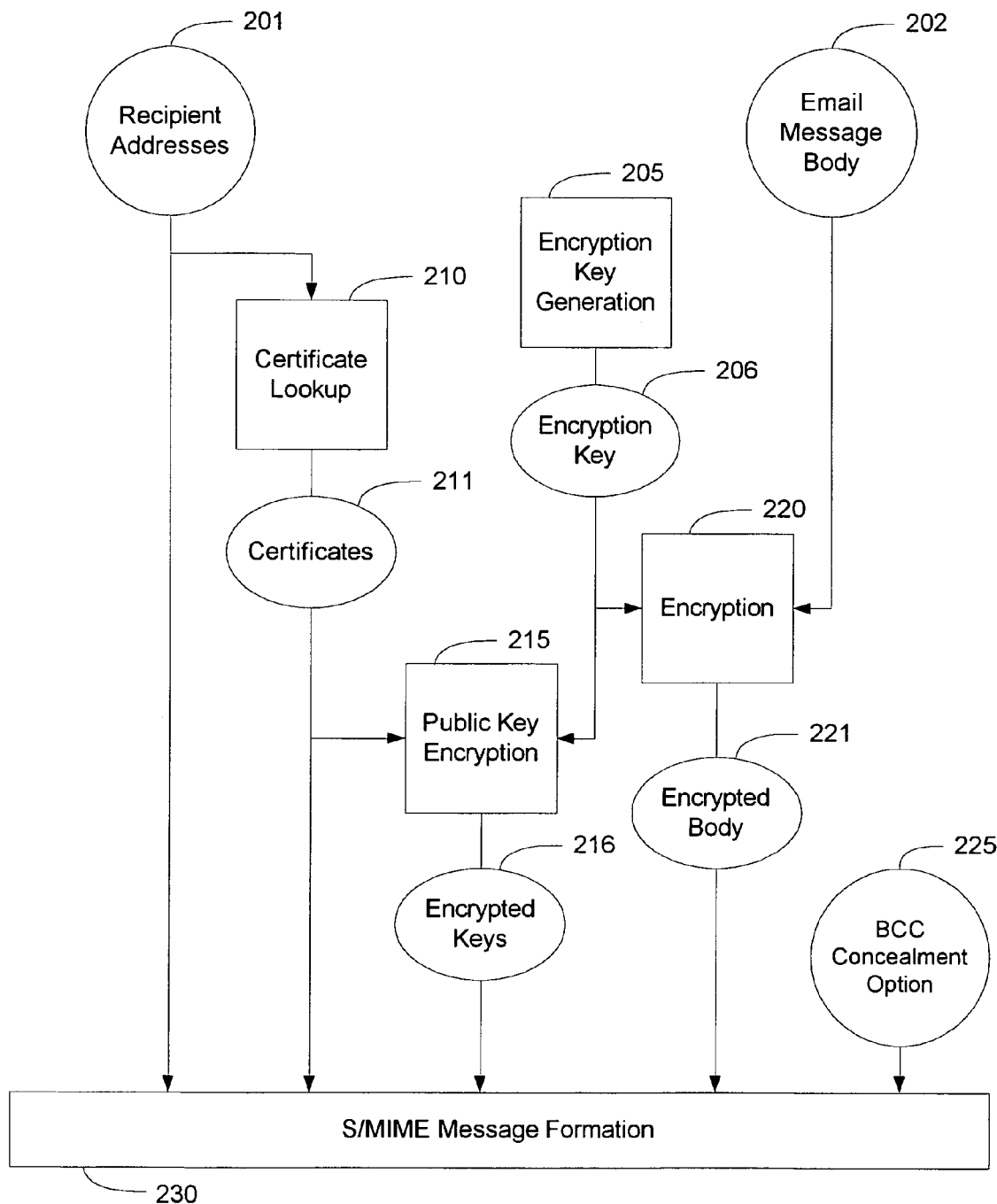
FIG. 5 is a flow diagram generally illustrating the creation of secure email messages according to an embodiment of the present invention.

Turning to FIG. 5, a flow diagram is shown illustrating the operations applied to various components contemplated by one embodiment of the present invention. As will be shown, one embodiment of the present invention contemplates creating separate encrypted messages to ensure that BCC recipients are disclosed only to the extent intended. The flow diagram of FIG. 5 begins with an email message having a header and an email message body 202, that could have been created by a human user entering text and data into an email software application, or by an automatic software process. The header of the email message can contain recipient information in the TO, CC and BCC fields in the form of email addresses, names, aliases, mailing list identifiers, and the like. Such recipient information can be converted into a series of recipient addresses 201 in a manner known to those skilled in the art.

Once the recipient addresses 201 are determined, they can be passed to an S/MIME message formation element 230 that can form an S/MIME message in the manner described in detail above. In addition, the recipient addresses 201 can be provided to a certificate lookup element 210. As will be known to those skilled in the art, certificate lookup element 210 can attempt to obtain a certificate, public key information, or similar information regarding each recipient in order to enable the S/MIME message formation element 230 to create a secure message, including encrypting the encryption key for each recipient, in the manner described in detail above. Certificate lookup element 210 can reference a central server, a local archive, or can contact recipients directly to obtain certificate information. Once the certificate lookup element 210 has completed its processing, a series of certificates 211, corresponding to the recipient address 201 can be generated.

In one embodiment contemplated by the present invention, there may not be a one-to-one correspondence between the certificates 211 and the recipient addresses 201. For example, a recipient may have more than one valid certificate. In such a case, one embodiment of the present invention can pass each of that recipient's valid certificates to the S/MIME message formation element 230 and create a set of encrypted encryption keys with each certificate. An alternative embodiment contemplated by the present invention can select a single certificate, or some combination of certificates, and pass those to the S/MIME message formation element 230 and create a set of encrypted encryption keys with only those selected certificates.

In another embodiment contemplated by the present invention, the S/MIME message formation element 230 need not receive the complete certificates 211, but can use only the certificate identifiers, and can derive information, such as a recipients public key, by using the certificate identifiers in a manner known to those skilled in the art. Such an embodiment can achieve efficiencies by not transferring the complete certificates 211. This can be helpful in environments, such as a mailing lists, where there may be hundreds or thousands of recipients.

The certificates 211 can also be provided to a public key encryption element 215, which can encrypt the encryption key 206 for each recipient. An encryption key generation element 205 can generate an encryption key 206. As described above, an encryption key 206 can be generated randomly by any number of key generation algorithms, and can be as simple as a random number. Once the encryption key generation element 205 has generated an encryption key 206, the encryption key 206 can be used by the encryption element 220 to encrypt the email message body 202 using an encryption algorithm. As described above, various algorithms can be used to encrypt the email message body 202 with the encryption key 206, including the DES, Triple-DES, RC2 and AES algorithms. The resulting encrypted body 221 can be provided to the S/MIME message formation element 230, which can create a secure message in the manner described in detail above.

The encryption key 206 can also be encrypted for each of the intended recipients by the public key encryption element 215. As described above, the public key encryption element 215 can use various types of encryption mechanisms to protect the encryption key 206, including the Diffie-Hellman, RSA, Triple-DES Key Wrap, RC2 Key Wrap, and RSAOEAP algorithms. Once the encryption key 206 has been encrypted for each of the recipients, the encrypted keys 216 can be provided to the S/MIME message formation element 230, which can incorporate the encrypted keys 216 into a series of secure messages consistent with the BCC concealment option 225 and in a manner to be described with reference to FIGS. 6 and 7 below.

Figure 6:
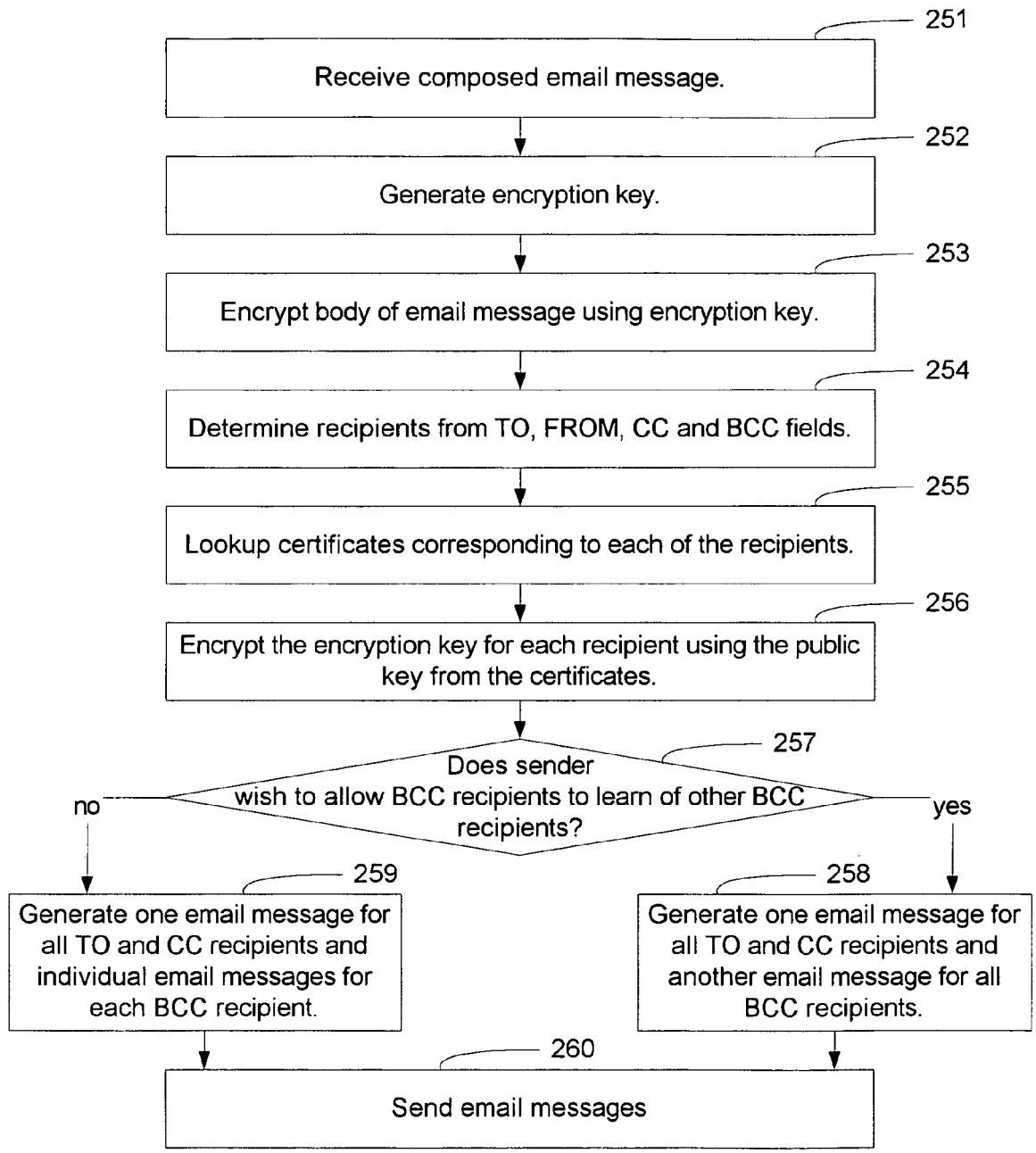
FIG. 6 is a flowchart generally illustrating the creation of secure email messages according to an embodiment of the present invention.

Turning to FIG. 6, a flowchart illustrating the operations depicted in FIG. 5 is shown. As indicated by step 251, one embodiment contemplated by the present invention can receive a composed email message, such as from a user entering the text and data into an email software application, or from an automated email creation application. At step 252 an encryption key can be generated using known key generation algorithms, or by simply generating a random value. At step 253, the body of the email message, received at step 251, can be encrypted using the key generated at step 252, and a known encryption algorithm, such as DES, Triple-DES, RC2 or AES. An alternative contemplated by an embodiment of the present invention only encrypts a portion of the message body. For example, a user could specify that only a section referencing confidential information can be encrypted. In such a case, the operation can proceed as illustrated in FIG. 6, with the exception that step 253 can encrypt only the selected message portion.

At step 254 the recipients of the email message can be determined from the TO, CC and BCC fields. An alternative embodiment contemplated by the present invention also references the FROM field to identify potential recipients. For example, a user can select an option by which all of that users sent email messages are BCCed to that user. In such a case, the user's own address or identity, specified in the FROM field, can be part of the recipient information.

Once the recipients are determined, corresponding certificates for each recipient can be located at step 255. At a subsequent step 256 the encryption key from step 252 can be encrypted for each recipient using information derived from each recipients' certificates located at step 255. For example, each recipient's certificate can contain that recipient's public key, which can be used to encrypt the encryption key for that recipient. As described above, some users or aliases can have multiple certificates. In such a case, step 256 can encrypt the encryption key using some or all of those multiple certificates assigned to a single user or alias.

Decision 257 allows the user to determine whether those recipients listed in the BCC field are to be allowed to learn of other recipients listed in the BCC field. If the user allows the BCC recipients to learn of one another, step 258 can be performed in which one S/MIME email message can be created for the recipients listed in the TO and CC fields, and sent to those recipients, and a second S/MIME email message can be created for the recipients listed in the BCC field, and can be sent to those recipients. Alternatively, if the user does not wish to allow BCC recipients to learn of other BCC recipients, step 259 can be performed in which one S/MIME email message can be created for the recipients listed in the TO and CC fields, and sent to those recipients, and a series of S/MIME email messages can be created for each of the recipients listed in the BCC field, and can be sent to each of those recipients individually. As shown in FIG. 6, the flowchart concludes with the transmission of the email messages created at step 258 or 259.

As illustrated above, an S/MIME message encrypted for a set of recipients can contain information about those recipients. For example, the recipientInfos field 143, described above with reference to FIG. 4, can provide recipient-specific information from which the identity of the recipients whose information is stored that field can be determined. Therefore, to avoid inadvertent disclosure of BCC recipients to those recipients listed in the TO and CC fields, one embodiment of the present invention contemplates creating an encrypted message for only those recipients listed in the TO and CC fields, and a separate message encrypted for those recipients listed in the BCC field. Therefore, as illustrated by steps 258 and 259, the recipients listed in the TO and CC fields only receive messages that are encrypted for them, and which are not encrypted for any BCC recipients. Consequently, even if one of the recipients were able to access the recipientInfos field 143, it would only provide information about other recipients already listed in the TO and CC fields of the received email, and it would not provide any information regarding any of the BCC recipients.

The BCC recipients can similarly be prevented from learning of any other BCC recipients. The decision 257 can be supplied via a user selection of a BCC concealment option 225, shown in FIG. 5, or it can be selected by a network administrator or the like. As can be seen from the above descriptions of steps 258 and 259, the selection of a BCC concealment option 225 affects the creation of messages for the recipients listed in the BCC field. Specifically, if it is desired that none of the BCC recipients learn of other BCC recipients, then individual S/MIME messages can be sent to each BCC recipient. By creating individual S/MIME messages for each BCC recipient, the S/MIME message can, as explained above, not contain any identifying information about any other BCC recipients. Therefore, even if one of the BCC recipients were able to access the recipientInfos field 143, it would only provide information about that same recipient, if the user had selected to not allow BCC recipients to learn of other BCC recipients.

Figure 7:
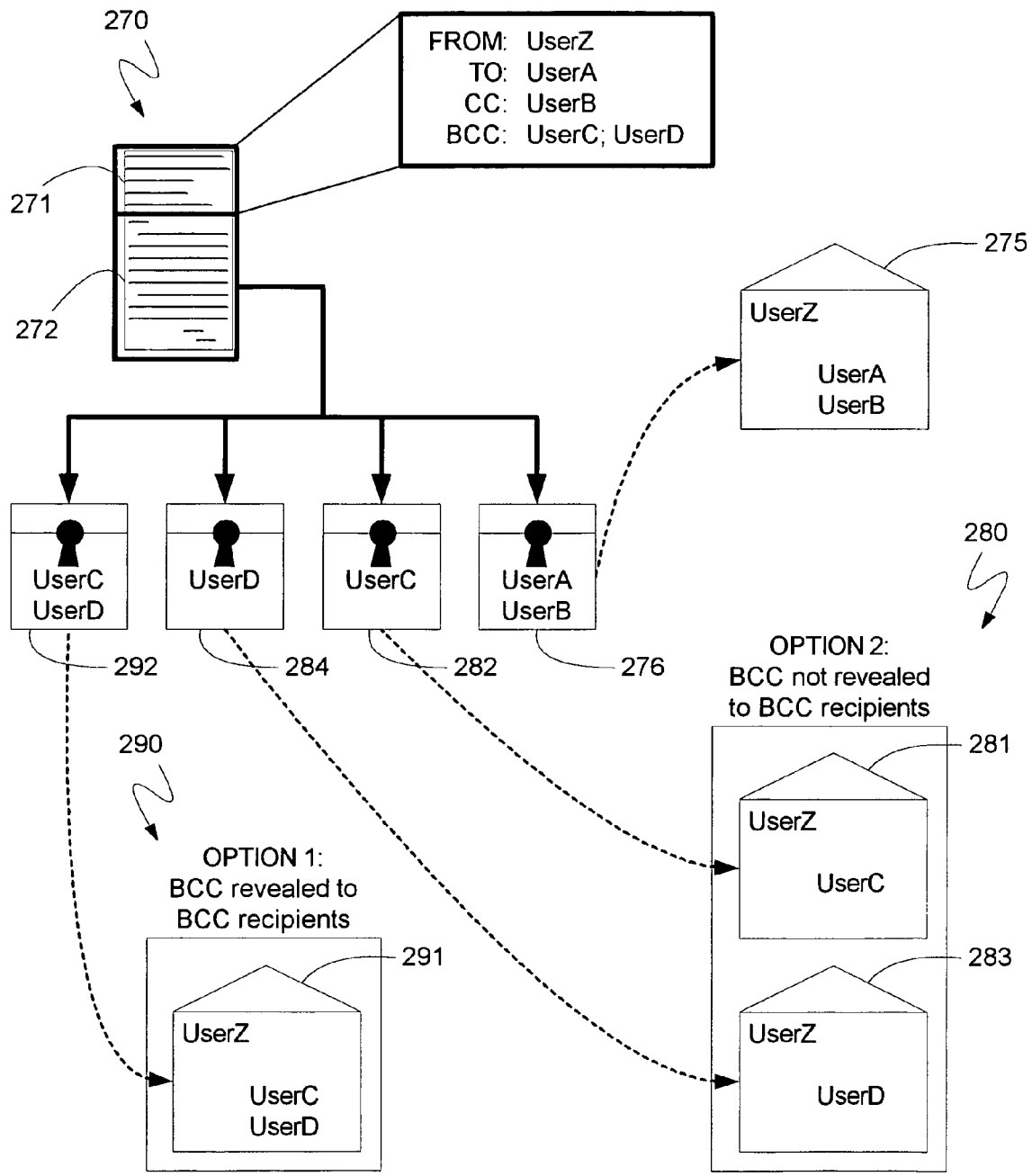
FIG. 7 is a block diagram generally illustrating multiple secure email messages according to an embodiment of the present invention.

The creation of multiple encrypted email messages to prevent unintended disclosure of hidden recipients contemplated by an embodiment of the present invention is further illustrated with reference to FIG. 7. As shown in FIG. 7, an email message 270, comprising a header 271 and a message body 272 can be encrypted using the data structures and processes described in detail above. However, as previously explained, because an encrypted message data structure can contain revealing information about all of the recipients for whom that structure is encrypted, one embodiment of the present invention contemplates limiting the recipients for which a particular encrypted message data structure is created to avoid inadvertent disclosure of the identity of recipients who should remain undisclosed. Consequently, the exemplary email message 270 is shown in FIG. 7 as optionally being encrypted into two or three separate encrypted packages.

The header 271 of exemplary email message 270 is shown in FIG. 7 as specifying that the message is from a UserZ, is addressed to a UserA, with a cc to a UserB, and a bcc to UserC and UserD. UserA and UserB are intended to be revealed recipients, since their information can remain in the header and be visible to all of the recipients. Consequently, an encrypted package 276 can be created and sent, via envelope 275 to UserA and UserB. As illustrated in FIG. 7, the encrypted package 276 can be encrypted for UserA and UserB only. As a result, user information, such as would be contained in the recipientInfos field 143 of the encrypted package 276 would only reveal UserA and UserB as recipients. Furthermore, in a manner known to those skilled in the art, the header 271 can be modified such that the header of the message delivered via envelope 275 to UserA and UserB either did not contain a BCC field, or contained a blank BCC field.

An encrypted version of the message body 272 can be sent to the BCC recipients as well, and can be created individually or as a single encrypted message depending on the user's preference for BCC concealment. For example, as shown in FIG. 7, a first option can be for the sender to allow BCC recipients to learn of other BCC recipients. In such a case, an encrypted package 292, encrypted for both UserC and UserD, can be created. The encrypted package 292 can then be sent to both UserC and UserD via envelope 291. Because encrypted package 292 is encrypted for both UserC and UserD, both users' identification can be contained in the encrypted package 292, such as in the recipientInfos field 143. However, since the sender had allowed BCC recipients to learn of other BCC recipients, such information does not result in an inadvertent disclosure of recipients that should have remained hidden. In fact, the header 271 of the message sent with envelope 291 can list the BCC recipients in the BCC field since envelope 291 is only being sent to UserC and UserD and the sender has allowed BCC recipients to learn of other BCC recipients.

Another option contemplated by one embodiment of the present invention allows the sender to prevent even BCC recipients from learning of other BCC recipients. In such a case, encrypted packages 282 and 284, encrypted individually for UserC and UserD, respectively, can be created. The encrypted package 282, encrypted only for UserC, can then be sent to UserC via envelope 281 and the encrypted package 284, encrypted only for UserD, can then be sent to UserD via envelope 283. Because encrypted package 282 is encrypted only for UserC and encrypted package 284 is encrypted only for UserD, both UserC and UserD can receive a message that contains recipient information, such as in the recipientInfos field 143, that specifies only themselves and no other recipients. Furthermore, because the sender has indicated that BCC recipients should not learn of other BCC recipients, the header 271 of the message sent with envelopes 281 and 283 can also have the BCC field removed or left blank. Alternatively, the header 271 of the message sent with envelopes 281 and 283 could contain a BCC field that lists only the BCC recipient to whom the message was sent.

As will be known by those skilled in the art, the recipients listed in the TO and CC fields are generally revealed to all of the recipients of the email message 270. Consequently, encrypted packages 282, 284, and 292 can be encrypted for UserA and UserB as well, since there is no concern regarding inadvertent disclosure of UserA and UserB. However, even though encrypted packages 282, 284, and 292 can be encrypted for UserA and UserB, they should not be sent to those users, since encrypted packages 282, 284, and 292 are also encrypted for some or all of the BCC recipients, which should not be revealed to either UserA or UserB.

As illustrated by the exemplary message 270 shown in FIG. 7, multiple encrypted packages can be created from a single message for transmission to distinct groups of recipients. In one embodiment of the present invention, each of the encrypted packages 276, 282, 284 and 292 can be independently generated, such as by repeating steps 252 and 253 shown in FIG. 6, and deriving and using a different encryption key for each package. Alternatively, steps 252 and 253 can be performed only once, encrypting the message body 272 with an encryption key, and then creating the encrypted packages 276, 282, 284 and 292 by simply encrypting the encryption key for the recipients indicated in FIG. 7. By encrypting the message body 272 only once, processing resources can be conserved, possibly resulting in greater efficiency.

The procedures and mechanisms illustrated in FIGS. 5 and 6, and described in detail above, can be performed either by the sending client 1, the sending server 2 or a combination thereof. For example, in one alternative contemplated by an embodiment of the present invention, the sending client 1 can compose an email message and transmit the email message to the sending server 2. The sending server 2 can then perform all of the steps illustrated in FIGS. 5 and 6. In another alternative contemplated by an embodiment of the present invention, the sending client 1 can perform all of the steps illustrated in FIGS. 5 and 6, with the exception of the actual sending of the email messages at step 260. For example, the sending client 1 could encrypt the email message body, lookup the certificates of the intended recipients, encrypt the encryption key for each of the intended recipients, and create the encrypted packages which can be attached to an email message, as described above, and transferred to the sending server 2 for transmission across network 5.

A further alternative contemplated by an embodiment of the present invention can allow the sending client 1 and the sending server 2 to divide task of performing the procedures and mechanisms illustrated in FIGS. 5 and 6. For example, the sending client 1 can compose the email message, encrypt it, and encrypt the encryption keys. The sending client 1 can then transfer to the sending server 2 the encrypted message and all of the encrypted encryption keys, together with an indication of which BCC concealment option the client desires. The sending server 2 can then determine which combinations of the encrypted encryption keys can be combined to form the appropriate encrypted packages, such as encrypted packages 276, 282, 284 and 292 shown in FIG. 7, for transmission to the appropriate groups of recipients. For example, the server can combine the encrypted encryption keys for the TO and CC recipients to create an encrypted package that can be sent to those recipients. Similarly, the server can combine the encrypted encryption keys for the BCC recipients in a manner consistent with the BCC concealment option selected. For example, if the BCC concealment option allows BCC recipients to know of other BCC recipients, then the server can combine the encrypted encryption keys for all of the BCC recipients into a single encryption package, such as package 292 shown in FIG. 7.

The sending client 1 and the sending server 2 can also interoperate with another server, such as the receiving server 3, to perform the procedures and mechanisms illustrated in FIGS. 5 and 6. In one alternative contemplated by the present invention, the ability to encrypt messages for specific recipients to avoid inadvertent disclosure of other recipients can be used by a computing device implementing a mailing list or similar email construct. As will be known by those skilled in the art, a mailing list can be comprised of hundreds, or even thousands, of individual email addresses. A single identifier, such as an alias, can be used by which an email message can be sent to all of the members of the email mailing list. However, because a large mailing list can require significant computational resources to implement, such mailing lists are often implemented by dedicated server computing devices. In such a case, a sender can send a single email to the server, which can, in turn, invisibly forward the email on to every member of the list. An additional advantage of a dedicated mailing list server is that the members' information is not revealed to any individual member of the list. Such protection can be helpful in preventing the spread of unwanted email messages, known as "spam", because senders of spam email often seek to obtain a large group of email addresses from email mailing lists.

However, as explained in detail above, if the email mailing list uses a secure email encoding scheme, such as the S/MIME encoding scheme, the individual recipients can be determined by referencing the encrypted packages sent by the mailing list server. In one embodiment of the present invention, a server computing device implementing a secure email mailing list can encrypt an email message for each member of the list individually, in a manner analogous to that described above with reference to the encrypted packages 282 and 284 of FIG. 7. In such a case, the server computing device can create a series of encrypted packages corresponding to each member of the email mailing list, and can individually send each package only to the member for whom the encryption key was encrypted, as described above.

To protect the transmission of email messages to the mailing list server, the messages from the sender to the server can be encrypted for the server itself. For example, if receiving server 3, shown in FIG. 1, were a mailing list server that was implementing a mailing list, the sending client 1 could create an encrypted package using the receiving server's certificate to encrypt the encryption key in the manner described in detail above. The sending client 1 could then transmit the message to the sending server 2 for transmission across the network to the receiving server 3. Once the receiving server 3 received the encrypted package, it could decrypt the package, create a series of new encrypted packages for each of the members of the mailing list, and then transmit each package individually to the mailing list member for whom the package was encrypted. In such a manner, a secure mailing list can be implemented while still avoiding any disclosure of the identify of the mailing list's members. Additional information regarding secure email mailing lists and other extensions to the S/MIME encoding scheme, can be found in the document entitled "Enhanced Security Services for S/MIME", Request for Comments: 2634, published by the Network Working Group of the Internet Engineering Task Force, dated June 1999, whose contents are herein incorporated by reference in their entirety to further explain or describe any teaching or suggestion contained within the present specification that is consistent with their disclosures.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for protecting the identity of one or more hidden recipients of an email message, the email message comprising an email header and an email body, the method comprising:
   creating a first encrypted email body by encrypting the email body using a first encryption key;
   creating a second encrypted email body by encrypting the email body using a second encryption key;
   creating a first encrypted email message, said first encrypted email message comprising a first email header referencing one or more revealed recipients, said first encrypted email message further comprising the first encrypted email body and, for each of the one or more revealed recipients, an encrypted version of the first encryption key;
   creating a second encrypted email message, said second encrypted email message comprising a second email header referencing one or more hidden recipients, said second encrypted email message further comprising the second encrypted email body and, for each of the one or more hidden recipients, an encrypted version of the second encryption key;
   transmitting the first encrypted email message to the one or more revealed recipients referenced by the first email header; and
   transmitting the second encrypted email message to the one or more hidden recipients referenced by the first email header.

2. The method of claim 1 further comprising: determining the one or more revealed recipients of the email message and determining the one or more hidden recipients of the email message.

3. The method of claim 2, wherein the email header comprises a TO field, a CC field, and a BCC field, and wherein further the one or more revealed recipients are determined by reference to the TO field and the CC field and the one or more hidden recipients are determined by reference to the BCC field.

4. The method of claim 1, wherein the first encryption key and the second encryption key are equivalent, and wherein the first encrypted email body and the second encrypted email body are equivalent.

5. The method of claim 1, wherein the creating the first encrypted email message comprises:
   locating one or more revealed recipient certificates corresponding to the one or more revealed recipients;
   obtaining one or more revealed recipient public keys corresponding to the one or more revealed recipients from the one or more revealed recipients, the first encryption key using the one or more revealed recipient public keys;
and wherein the creating the second encrypted email message comprises:
  locating one or more hidden recipient certificates corresponding to the one or more hidden recipients;
  obtaining one or more hidden recipient public keys corresponding to the one or more hidden recipients from the one or more hidden recipient certificates; and
  encrypting, for each of one or more hidden recipients, the second encryption key using the one or more hidden recipient public keys.

6. The method of claim 1, wherein the creating the second encrypted email message comprises creating one or more encrypted email messages corresponding to the one or more hidden recipients, wherein each encrypted email message of the one or more encrypted email messages comprises the second encrypted email body and the second encryption key encrypted for a corresponding hidden recipient; and wherein the transmitting the second encrypted email message comprises transmitting the one or more encrypted email messages to the corresponding one or more hidden recipients.

7. The method of claim 6, wherein the one or more hidden recipients are members of an email mailing list referenced in the email header.

8. A computer-readable medium having computer-executable instructions for protecting the identity of one or more hidden recipients of an email message, the email message comprising an email header and an email body, the computer-readable instructions performing steps comprising:
  creating a first encrypted email body by encrypting the email body using a first encryption key;
  creating a second encrypted email body by encrypting the email body using a second encryption key;
  creating a first encrypted email message, said first encrypted email message comprising a first email header referencing one or more revealed recipients, said first encrypted email message further comprising the first encrypted email body and, for each of the one or more revealed recipients, an encrypted version of the first encryption key;
  creating a second encrypted email message, said second encrypted email message comprising a second email header referencing one or more hidden recipients, said second encrypted email message further comprising the second encrypted email body and, for each of the one or more hidden recipients, an encrypted version of the second encryption key;
  transmitting the first encrypted email message to the one or more revealed recipients referenced by the first email header; and
  transmitting the second encrypted email message to the one or more hidden recipients referenced by the second email header.

9. The computer-readable medium of claim 8 having further computer-executable instructions for performing steps comprising: determining the one or more revealed recipients of the email message and determining the one or more hidden recipients of the email message.

10. The computer-readable medium of claim 9, wherein the email header comprises a TO field, a CC field, and a BCC field, and wherein further the one or more revealed recipients are determined by reference to the TO field and the CC field and the one or more hidden recipients are determined by reference to the BCC field.

11. The computer-readable medium of claim 8, wherein the first encryption key and the second encryption key are equivalent, and wherein the first encrypted email body and the second encrypted email body are equivalent.

12. The computer-readable medium of claim 8, wherein the creating the first encrypted email message comprises:
  locating one or more revealed recipient certificates corresponding to the one or more revealed recipients;
  obtaining one or more revealed recipient public keys corresponding to the one or more revealed recipients from the one or more revealed recipient certificates; and
  encrypting, for each of one or more revealed recipients, the first encryption key using the one or more revealed recipient public keys;
and wherein the creating the second encrypted email message comprises:
  locating one or more hidden recipient certificates corresponding to the one or more hidden recipients;
  obtaining one or more hidden recipient public keys corresponding to the one or more hidden recipients from the one or more hidden recipient certificates; and
  encrypting, for each of one or more hidden recipients, the second encryption key using the one or more hidden recipient public keys.

13. The computer-readable medium of claim 8, wherein the creating the second encrypted email message comprises creating one or more encrypted email messages corresponding to the one or more hidden recipients, wherein each encrypted email message of the one or more encrypted email messages comprises the second encrypted email body and the second encryption key encrypted for a corresponding hidden recipient; and wherein the transmitting the second encrypted email message comprises transmitting the one or more encrypted email messages to the corresponding one or more hidden recipients.

14. The computer-readable medium of claim 13, wherein the one or more hidden recipients are members of an email mailing list referenced in the email header.

15. A computer-readable medium having computer-executable instructions for protecting the identity of one or more hidden recipients of an email message, the email message comprising an email header and an email body, the computer-readable instructions performing steps comprising:
  determining one or more revealed recipients of the email message;
  determining the one or more hidden recipients of the email message; and
  selecting a hidden recipients concealment option;
wherein the one or more revealed recipients will receive a first encrypted email message comprising, for each of one or more revealed recipients, an encrypted version of a first encryption keys, a first encrypted email body created by encrypting the email body using the first encryption key, and the first email header of revealed recipients; and
  wherein further each of the one or more hidden recipients will receive, depending on the selected hidden recipients concealment option, either a second encrypted email message comprising, for each of one or more hidden recipients, an encrypted version of a second encryption key, a second encrypted email body created by encrypting the email body using the second encryption key, and the second email header of hidden recipients, or a corresponding one or more encrypted email messages corresponding to the one or more hidden recipients, wherein each encrypted email message of the corresponding one or more encrypted email messages comprises the second encryption key encrypted for a corresponding hidden recipient, a second encrypted email body created by encrypting the email body using the second encryption key, and the second email header of the corresponding hidden recipient.

16. The computer-readable medium of claim 15, wherein the email header comprises a TO field, a CC field, and a BCC field, and wherein further the one or more revealed recipients are determined by reference to the TO field and the CC field and the one or more hidden recipients are determined by reference to the BCC field.

17. The computer-readable medium of claim 15, wherein the first encryption key and the second encryption key are equivalent, and wherein the first encrypted email body and the second encrypted email body are equivalent.

18. The computer-readable medium of claim 15 having further computer-executable instructions for performing steps comprising:
 encrypting the first encryption key for each of the one or more revealed recipients;
 encrypting the second encryption key for each of the one or more hidden recipients; and
 transmitting the encrypted first encryption keys, the encrypted second encryption keys, and an indication of the revealed recipients, the hidden recipients and the selected hidden recipients concealment option to a computing device, the computing device creating and transmitting the first encrypted email message and either the second encrypted email message or the corresponding one or more encrypted email messages depending on the selected hidden recipients concealment option.

19. The computer-readable medium of claim 18, wherein the encrypting the first encryption key comprises:
 locating one or more revealed recipient certificates corresponding to the one or more revealed recipients;
 obtaining one or more revealed recipient public keys corresponding to the one or more revealed recipients from the one or more revealed recipient certificates; and
 encrypting, for each of one or more revealed recipients, the first encryption key using the one or more revealed recipient public keys;
and wherein the encrypting the second encryption key comprises:
 locating one or more hidden recipient certificates corresponding to the one or more hidden recipients;
 encrypting, for each of one or more hidden recipients, the second encryption key using the one or more hidden recipient public keys.

* * * * *